United States Patent [19]
Ferrell

[11] Patent Number: 5,829,862
[45] Date of Patent: Nov. 3, 1998

[54] ILLUMINATED LIGHTING STRUCTURE

[76] Inventor: Tommy Dale Ferrell, 11447 W. Dixie La., Republic, Mo. 65738

[21] Appl. No.: 604,389

[22] Filed: Feb. 21, 1996

[51] Int. Cl.⁶ ....................................................... F21V 8/00
[52] U.S. Cl. ............................ 362/32; 362/124; 362/806; 362/808
[58] Field of Search ............................... 362/26, 32, 122, 362/124, 806, 808, 807; 446/219, 485

[56] References Cited

U.S. PATENT DOCUMENTS

| 4,559,583 | 12/1985 | Ku | 362/806 |
| 4,727,603 | 3/1988 | Howard | 362/806 |
| 4,858,086 | 8/1989 | Pietrantonio et al. | 362/122 |
| 5,483,427 | 1/1996 | Dealey, Jr. et al. | 362/32 |
| 5,537,297 | 7/1996 | Ghandehari | 362/32 |

FOREIGN PATENT DOCUMENTS

| 1746109 | 7/1992 | U.S.S.R. | 362/32 |

*Primary Examiner*—Stephen F. Husar
*Attorney, Agent, or Firm*—Chase & Yakimo

[57] ABSTRACT

An illuminated lighting fixture having a central housing for a powered light source with fiber optic cables in communication with the housing. The light source emits light within the housing for direction to the fiber optic cables in communication therewith. The fiber optic cables, upon extension from the housing, define selectable illuminated configurations, the now preferred overall configuration being a butterfly with the housing presenting the body of the butterfly and the fiber optic cables tracing the illuminated butterfly wings or portions thereof.

16 Claims, 4 Drawing Sheets

ILLUMINATED LIGHTING STRUCTURE

BACKGROUND OF THE INVENTION

This invention relates to a lighting fixture, and more particularly, to a fixture that ornamentally replicates selectable design configurations such as a butterfly.

The use of illuminated lighting fixtures, such as night lights, lamps, etc., is known. However, the aesthetic appearance of such devices is limited as the method of illumination has been limited. For example, in a night-light a bulb illuminates an overlying casing, the configuration usually being imprinted on the casing.

Due to such limitation, the aesthetics of such lighting fixtures are limited. Thus, it would be desirable to have an illuminated lighting fixture, such as a night-light or the like, which is aesthetically pleasing in structure while performing its desired illuminating function.

In response thereto I have invented a novel lighting fixture having structure enhancing the aesthetics of the finished product. My now preferred embodiment is in the general form of a butterfly. My device generally comprises a light source in the form of an LED or halogen bulb located within a central housing. Extending from the housing are fiber optic cables which define the shape of the desired illuminated configuration in the general butterfly shape. In my now preferred embodiment the central housing presents the body of the butterfly with the fiber optic cables tracing the configuration of the attached wings or the veins therein. The housing includes reflective material therein with the light source being powered by either a DC battery or connected to a plug for insertion into an AC power socket. Upon power delivery, the resulting light in the housing is carried by the fiber optic cables so as to present a selected illuminated configuration in the fixture having a now preferred overall butterfly form.

It is therefore a general object of this invention to provide an illuminated lighting fixture having an aesthetically pleasing appearance.

It is another object of this invention to provide a fixture, as aforesaid, utilizing a central light source with fiber optic cables branching therefrom so as to present a selected illuminated appearance.

A still further object of this invention is to provide a fixture, as aforesaid, the light source being powered either by direct or alternating current.

Another object of this invention is to provide a fixture, as aforesaid, the fiber optic cables defining a selected illuminated configuration for the fixture.

A more particular object of this invention is to provide a fixture, as aforesaid, the general configuration being a butterfly.

Another particular object of this invention is to provide a fixture, as aforesaid, the light source being housed in a housing presenting the body of the butterfly.

A further particular object of this invention is to provide a fixture, as aforesaid, the fiber optic cables extending along the wing elements of the butterfly.

A more particular object of this invention is to provide a fixture, as aforesaid, the fiber optic cables further extending along veins of the butterfly wings.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
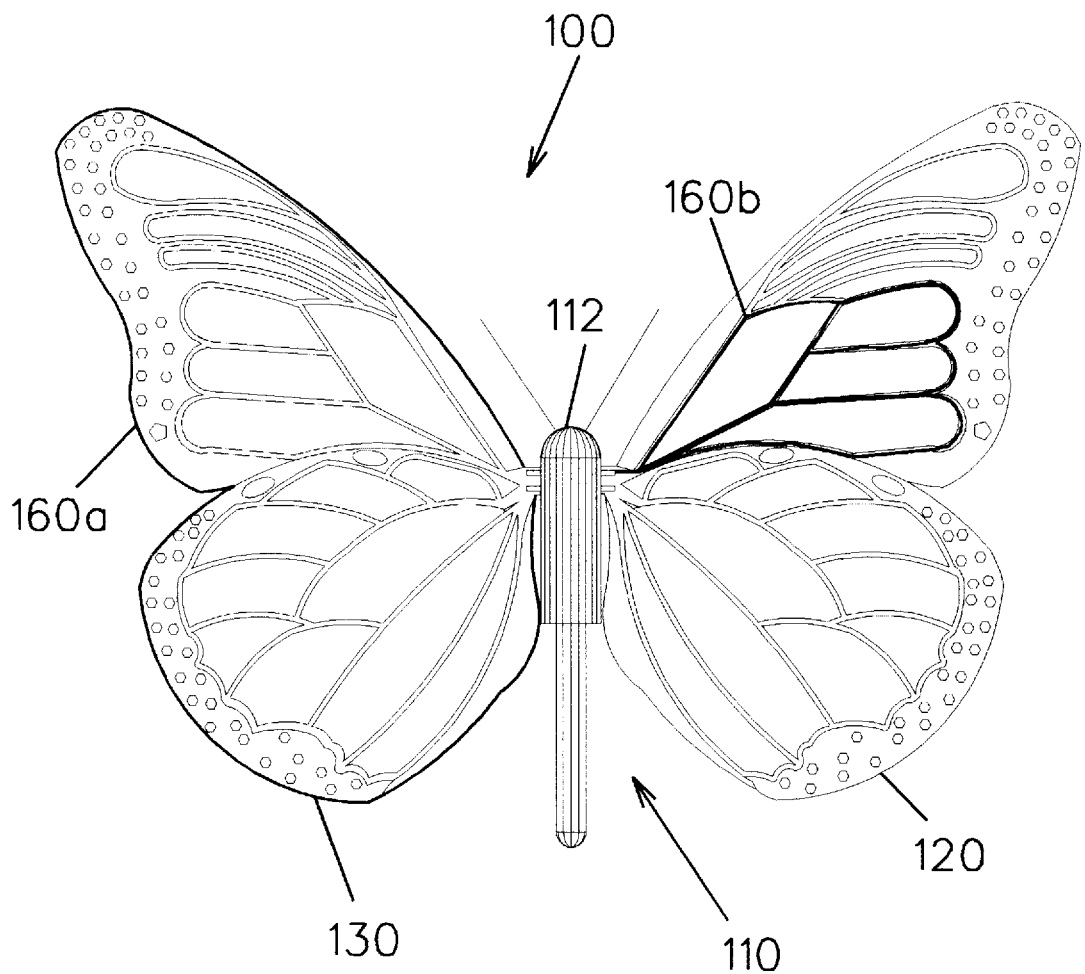
FIG. 1 is a top plan view of the lighting fixture showing the selected configuration as a butterfly and in bold the illuminated configuration with AC plug removed.

Turning more particularly to the drawings, my now preferred lighting fixture 100 is shown as a butterfly in FIGS. 1–5, it being understood that other configurations may be selected utilizing the teachings of my invention disclosed herein. The device 100 comprises a housing 110 having a first 120 and second 130 wings attached thereto. Wings 120, 130 may be made of a clear plastic material or the like.

The housing 110 presents the butterfly body and includes a releasable cap 112. The light source 114 can be in the form of an LED/halogen bulb. The source can be either powered by a DC battery insertable through cap 112 or can be connected to a plug 118 with the LED/bulb 114 being inserted through an aperture in the bottom of housing 110. The plug 118 may then be inserted into any available AC socket.

In communication with the housing 110 are fiber optic cables 160a, 160b which extend along or through the wing elements 120, 130. Cable 160a defines the general overall shape of the wing element 130 with cable 160b shown as defining the vein portions of wing element 120 as shown in bold in FIG. 1.

Figure 2:
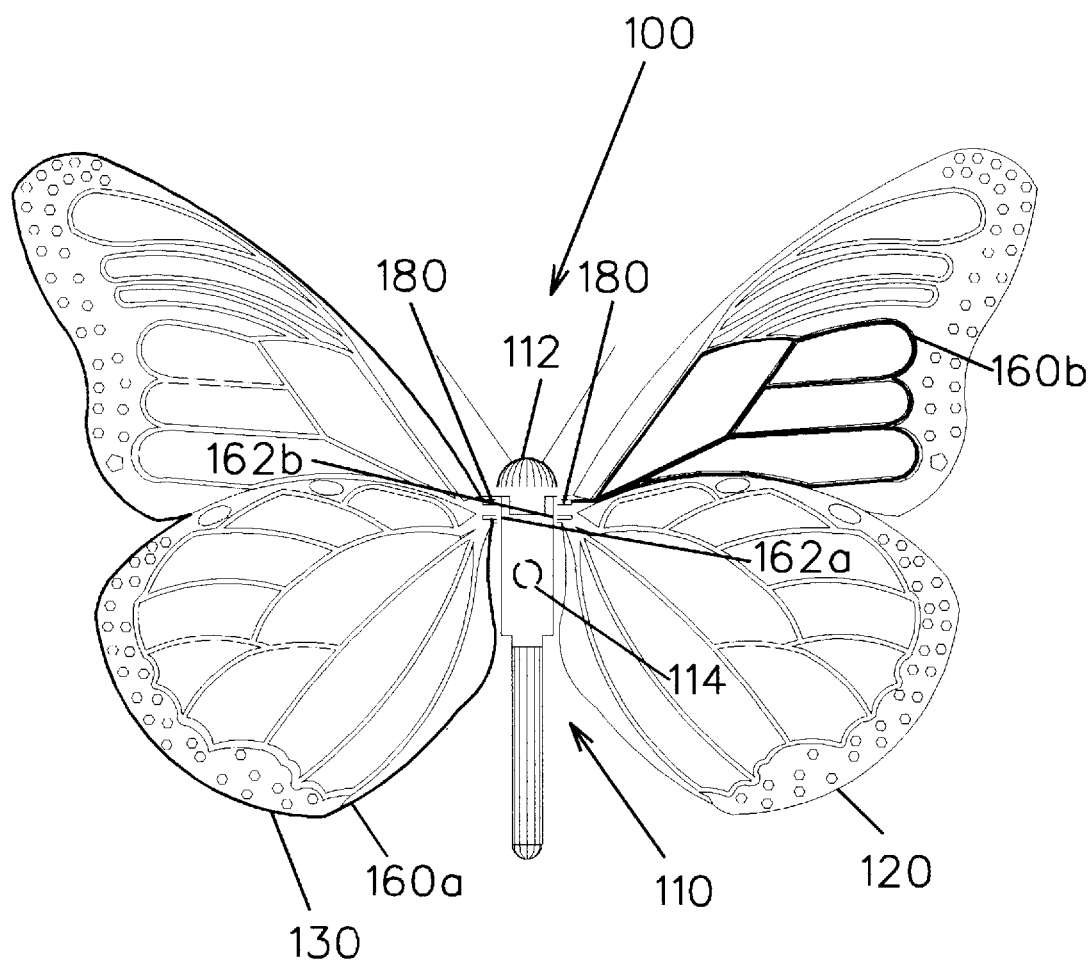
FIG. 2 is a bottom view of the fixture of FIG. 1.
Figure 3:
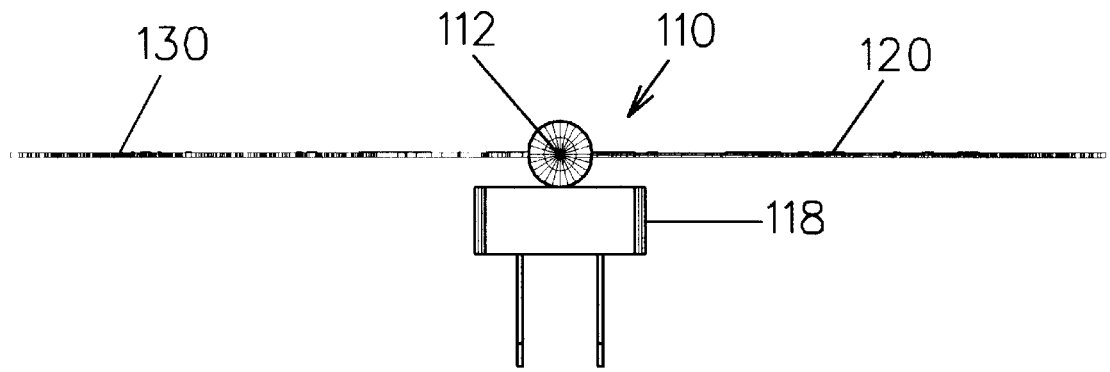
FIG. 3 is a front view of the fixture of FIG. 1 with AC plug in place.
Figure 4:
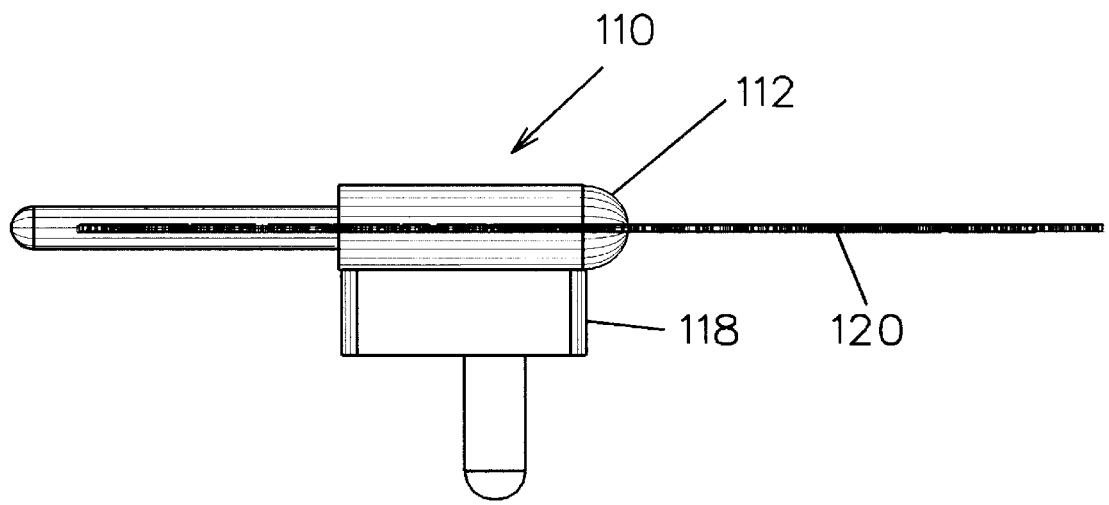
FIG. 4 is an enlarged right side view of the fixture of FIG. 3.
Figure 5:
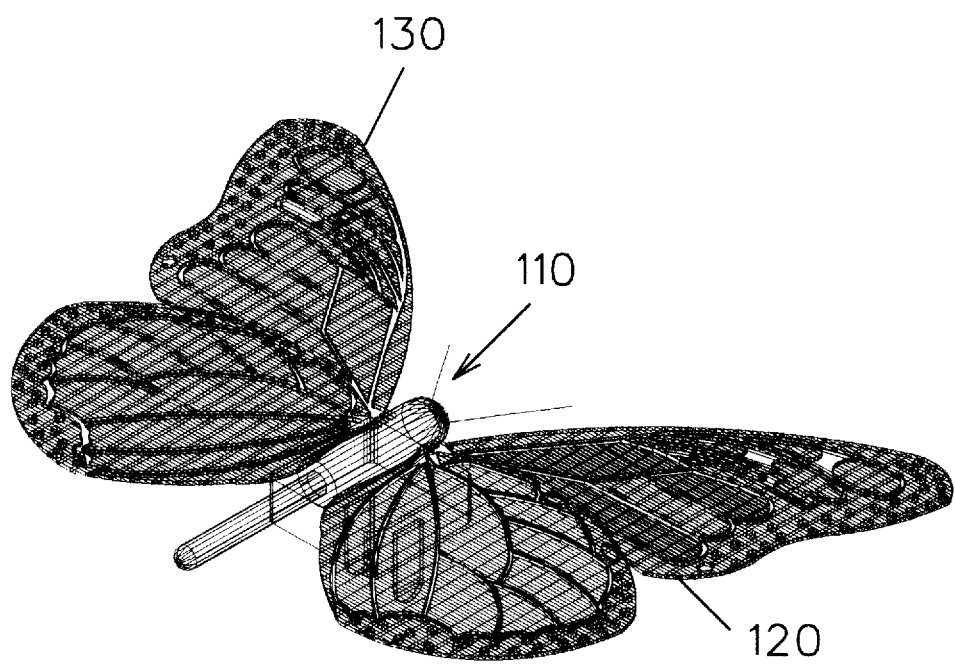
FIG. 5 is a perspective view of the fixture of FIG. 1 on a relatively reduced scale.

As shown in FIGS. 1–2 both ends of cable 160a are connected to ports 162a in the body housing 110 by ferrules 180. One end of cable 160b is connected to housing 110 by means of ferrule 180 in port 162b. Thus, upon extension of the cables 160a, 160b from the body 110 the cables can be extended along selected illuminated paths relative to the supporting butterfly wing elements 120, 130. It is understood that the cables need not trace all veins of the wings 120, 130 and need not trace the entire overall general shape of such wings 120, 130, if desired. Moreover, graphics on the wings 120, 130 may also be used. As shown, the cables 160a, 160b preferably extend from opposed sides of the housing 110.

The inside walls of the housing 110 may have a reflective material thereon so as to enhance the dispersion of the light within the housing 110 and initial light transfer to the optic cables 160.

It is thus understood that the combination of the housing 110 having the light source 114 therein presents a central lighting reservoir. The fiber optic cables 160a, 160b communicate with this reservoir 110 by means of the above-described port 162a, 162b/ferrule 180 combination. Upon extension of the fiber optic cables 160a, 160b and branches thereof from this illumination housing 110, selectable illuminated configurations can be defined.

It is to be understood that while a certain form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. A light fixture of a butterfly configuration comprising:
   a central housing;
   means for producing light within said housing;
   means for powering said light producing means;
   at least a pair of supports comprising a butterfly wing-like configuration, said supports made from a material for passage of light therethrough and extending in opposite directions from said housing;
   a plurality of fiber optic cables for defining an illuminated butterfly wing-like configuration along each of said supports;
   means for communicating an end of at least one of said cables on each of said supports to said housing for entry of light produced by said producing means therein and along said at least one of said cables on each support whereby to produce said illuminated butterfly wing-like configuration.

2. The fixture as claimed in claim 1 wherein said powering means comprises an AC plug in communication with said light producing means, said plug engaging an AC socket.

3. The fixture as claimed in claim 1 wherein said powering means comprises a DC battery in communication with said light producing means.

4. The fixture as claimed in claim 1 wherein said communicating means comprises:
   a plurality of ports in said housing;
   at least one of said cable ends of said plurality of cables on each support connected to one of said respective ports.

5. The fixture as claimed in claim 1 wherein said housing presents a configuration comprising a butterfly body.

6. The fixture as claimed in claim 1 wherein at least one cable of said plurality of said fiber optic cables on each support is configured to define first and second butterfly wings extending from the body and along said supports.

7. The fixture as claimed in claim 4 further comprising additional fiber optic cables on each support and in communication with said at least one cable on each support being connected with one of said ports in said housing, said additional cables configured to define veins in said butterfly wing-like configuration along said supports.

8. The fixture as claimed in claim 1 further comprising a reflective material inside said housing for dispersion of light produced by said light producing means within said housing.

9. The fixture as claimed in claim 6 wherein said supports are made of a material for passage of light therethrough.

10. The fixture as claimed in claim 6 wherein said at least one cable on each support extends along a perimeter of each support.

11. The fixture as claimed in claim 1 further comprising additional fiber optic cables on each support and in communication with said at least one cable on each support in communication with said housing, said additional cables configured to define veins in said butterfly wing-like configurations along said supports.

12. A light fixture of a butterfly configuration comprising:
   a central housing presenting a configuration of a butterfly body;
   means for producing light within said housing;
   means for powering said light producing means;
   at least a pair of supports comprising a butterfly wing-like configuration, said supports made from a material for passage of light therethrough and extending in opposite directions from said housing;
   a plurality of fiber optic cables for defining an illuminated butterfly configuration along each of said supports, at least one cable of said plurality of cables on each support configured to define a butterfly wing configuration;
   means for communicating an end of at least one of said cables on each of said supports to said housing for entry of light produced by said producing means therein and along said at least one of said cables on each support whereby to produce said butterfly configuration.

13. The fixture as claimed in claim 12 further comprising additional fiber optic cables on each support and in communication with said at least one cable on each support being in communication with said housing, said additional cables configured to define veins in said butterfly wing configuration along each support.

14. The fixture as claimed in claim 12 wherein said communicating means comprises:
   a plurality of ports in said housing;
   at least one of said cable ends of said plurality of cables on each support connected to at least one of said respective ports.

15. The fixture as claimed in claim 14 further comprising additional fiber optic cables on each support and in communication with said at least one cable on each support being connected with said housing port, said additional cables configured to define veins of said butterfly wings along said supports.

16. The fixture as claimed in claim 12 further comprising a reflective material inside said housing for dispersion of light therearound.

* * * * *